United States Patent [19]

Krause

[11] Patent Number: 4,646,796
[45] Date of Patent: Mar. 3, 1987

[54] LIQUID LEVEL SENSING APPARATUS

[75] Inventor: Ronald O. Krause, Waukesha, Wis.

[73] Assignee: Marathon Engineers/Architects/Planners, Menasha, Wis.

[21] Appl. No.: 694,345

[22] Filed: Jan. 24, 1985

[51] Int. Cl.[4] .............................................. B67C 3/00
[52] U.S. Cl. ...................................... 141/234; 73/314; 141/145
[58] Field of Search ...................... 141/1, 145, 18, 234; 73/314

[56] References Cited

U.S. PATENT DOCUMENTS 1,597,358  8/1926  Hansen ............................ 141/145 X
3,572,122  3/1971  Nusbaum ............................... 73/314

*Primary Examiner*—Stephen Marcus
*Assistant Examiner*—Mark Thronson
*Attorney, Agent, or Firm*—Andrus, Sceales, Starke & Sawall

[57] ABSTRACT

An apparatus for detecting and maintaining the level of a liquid in a container filling machine having a rotatable filler bowl includes a float disposed within the liquid in the bowl and having a permanent magnet disposed within the float body. A liquid level indicating bar is mounted within the bowl and is formed from a magnetically responsive material so that vertical movement of the float results in a vertical movement of the liquid level indicating bar. An infrared photo detector is provided for detecting the position of the liquid level indicator and controls are provided for increasing or decreasing the rate of flow of liquid into the bowl depending on the detected level of the liquid.

3 Claims, 5 Drawing Figures

LIQUID LEVEL SENSING APPARATUS

BACKGROUND OF THE INVENTION

This invention relates to an apparatus for detecting and maintaining the level of a liquid and more particularly relates to a device for monitoring the level of the liquid in a container filling machine having a doughnut shaped rotatable filler bowl, an inlet for receiving liquid and a plurality of outlets for filling containers with liquid from the bowl.

Heretofore, the liquid level in such doughnut shaped filler bowls has been monitored by a device located in and rotating with the filler bowl. The signal generated by this device would be fed along lines from the bowl to the central opening and up to a point above the bowl and then back out across the bowl to a control station outside the perimeter of the bowl. Such a system has a number of obvious drawbacks including the positioning and maintaining of the physical transmission lines from the monitoring point to the control station. The continuous rotation of the bowl adds to the difficulty of maintaining such transmission lines.

Liquid measuring devices such as that shown in U.S. Pat. No. 2,102,615 to Cubite, measure the amount of liquid in a container by means of a float. However, the '615 device does not automatically fill the tank or vary the rate of flow of liquid into the tank.

Other devices, such as that shown in U.S. Pat. No. 4,059,227 to Hunter, vary the rate of flow of a liquid in response to a liquid level detection device. However, the '227 device requires physical connections between the float and the float position detector, resulting in the same disadvantages posed by the devices currently in use.

It is desirable to provide a liquid level monitoring device for use with a rotatable filler bowl that eliminates the physical connections presently used by the prior art and which automatically controls the rate of flow into the bowl depending on the level of the liquid in the bowl.

SUMMARY OF THE INVENTION

An apparatus for detecting and maintaining the level of a liquid in a rotatable filler bowl includes a substantially hollow float body disposed around a hollow rod extending vertically into the liquid in the filler bowl. A permanent magnet is mounted within the hollow float body adjacent the vertical rod.

In accordance with another aspect of the invention, the apparatus is provided with a magnetically responsive bar located within the hollow rod. Thus, variations of the liquid level in the bowl result in a vertical displacement of the float which in turn results in a vertical displacement of the bar.

In accordance with yet another aspect of the invention, the apparatus is provided with a detector for monitoring the position of the liquid level indicating bar.

The apparatus is further provided with means for comparing the level of the liquid detected with a predetermined level.

In accordance with yet another aspect of the invention, the apparatus is provided with control means that are operably connected to the comparing means and which operate a valve or variable speed pump for controlling the rate of flow of fluid into the bowl.

The float and the liquid level indicating bar are mounted for movement with the bowl, while the detector means is stationary and is not physically attached to the liquid level indicating bar.

The present invention thus provides an apparatus for detecting and maintaining the level of the liquid in the filler bowl, which eliminates the need for physical connections between the monitoring device and the control device and thus eliminates the disadvantages inherent in the prior art systems.

BRIEF DESCRIPTION OF THE DRAWINGS

The drawings illustrate the best mode presently contemplated of carrying out the invention.

In the drawings.

DESCRIPTION OF THE PREFERRED EMBODIMENT

Figure 1:
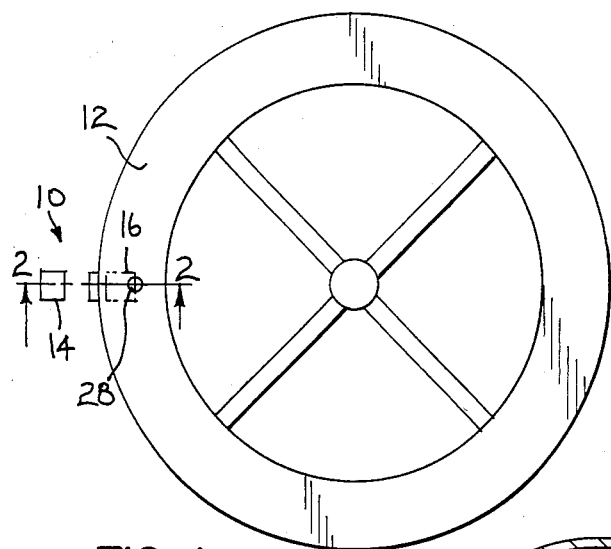
FIG. 1 is a plan view of a filler bowl of a container filling machine utilizing the liquid level detection apparatus of the present invention.

As shown in FIG. 1, an apparatus 10 for detecting and maintaining the level of a liquid in a container filling machine is mounted on a rotatable doughnut shaped filler bowl 12. The apparatus consists of a position detector 14, a liquid level detector 16 and a liquid level indicator assembly 18.

Figure 3:
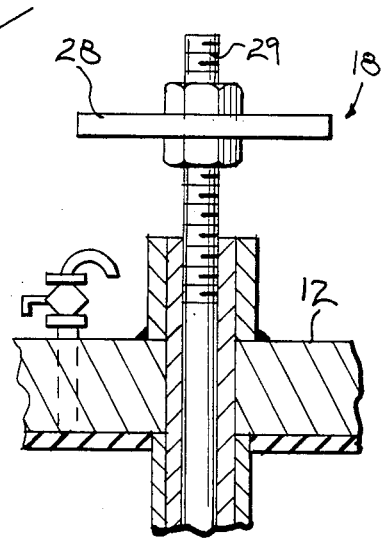
FIG. 3 is a cross sectional view of the float and liquid level indicator of the present invention.
Figure 4:
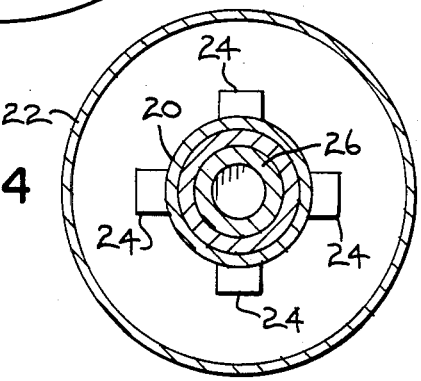
FIG. 4 is a section taken along line 4—4 of FIG. 2.
Figure 2:
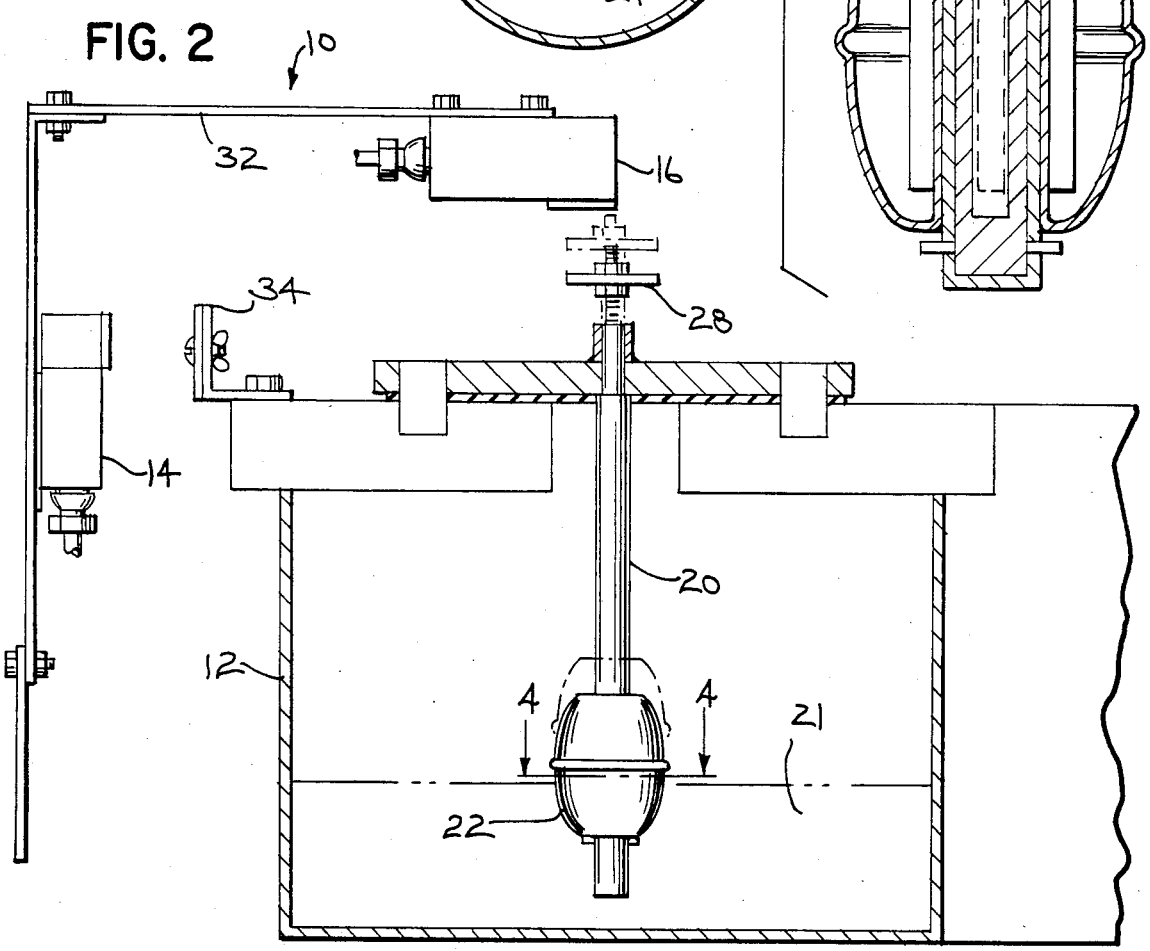
FIG. 2 is an enlarged section taken along line 2—2 of FIG. 1.

As best shown in FIG. 3, liquid level indicator assembly 18 is mounted on filler bowl 12 for rotational movement with the filler bowl. Filler bowl 12 has a hollow rod 20 vertically disposed within the bowl and extending downwardly into the bowl and into the liquid 21 contained therein. A hollow float body 22 is disposed about hollow rod 20 and includes a number of permanent magnets 24 mounted within the body and substantially adjacent hollow rod 20.

A liquid level indicating bar 26 is disposed within hollow rod 24 and is formed from a magnetically receptive material. A target reflector plate 28 is mounted to the upper portion of bar 26 which extends outwardly from the interior of bowl 12. Target plate 28 is mounted on a threaded extension 29 of indicating bar 26 so that its position may be varied.

The position of target reflector plate 28 is detected and monitored by liquid level detector 16 which is an infrared photo detector. In the preferred embodiment, detector 16 is an analog output scanner marketed by BANNER ENGINEERING CO. under the Model Numbers SBD5 and SBDL5. Detector 16 modulates a current signal which varies according to the distance between detector 16 and target reflector plate 28.

Detector 16 and position detector 14 are mounted on a stationary bracket 32.

Position detector 14 is utilized to determine when target plate 28 has come into position beneath detector 16. In the preferred embodiment, position detector 14 is an inductive proximity switch marketed by Turck Multi Prox, Inc. under Model Number NI 20NF-CP40-UZ3-X. Position detector 14 will close a contact upon detecting the proximity of target 34 which is mounted on bowl 12 for rotation with the bowl.

Figure 5:
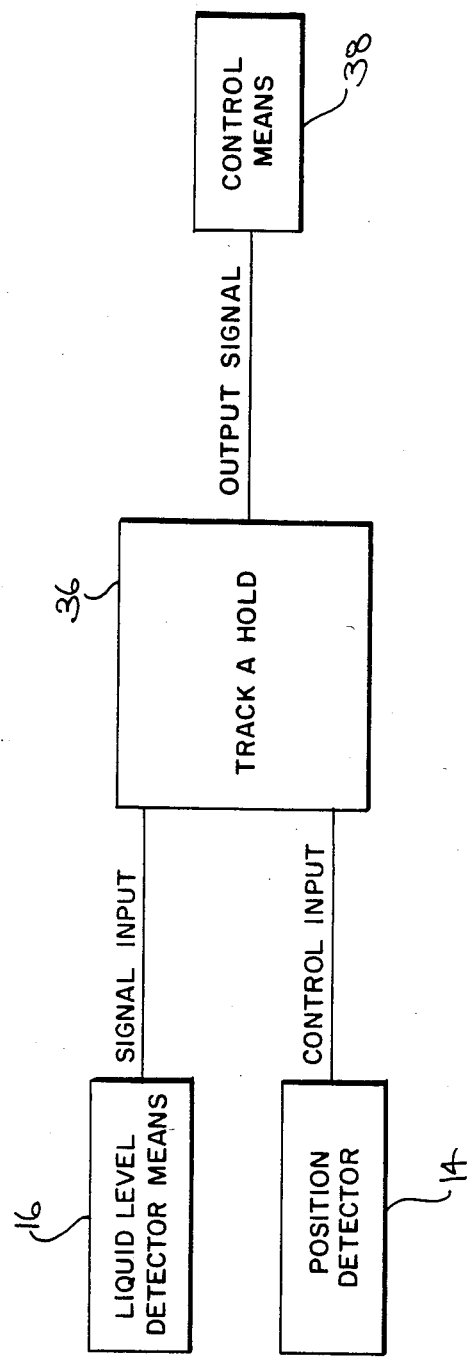
FIG. 5 is a schematic of the electrical controls utilized by the present invention.

As seen in the schematic of FIG. 5, the voltage signal from position detector 14 is utilized as a control input on a track and hold device 36. In the embodiment shown here, the track and hold device utilized is marketed by AcroMag ® under Model Number 1768. Liquid level detector 16 provides the variable signal input to the track and hold device 36. Track and hold device 36 in turn provides an output signal to valve control device 38. Valve control device 38 compares the output signal from track and hold device 36 with a predetermined signal which is indicative of an optimum liquid level. The output of the control device is then utilized to control one or more servo valves or variable speed pumps (not shown) which control the rate of flow of liquid into filler bowl 12. In the embodiment shown here, control device 38 is a digital indicating controller marketed by Honeywell under Model Number DC100.

In operation, float body 22 and liquid level indicating bar 26 rotate along with filler bowl 12. As the level of liquid 21 varies in filler bowl 12, the vertical position of float 22 will vary along rod 20. This results in a vertical displacement of liquid level indicating bar 26 and target reflector plate 28.

When target plate 28 is out from beneath detector 16, track and hold unit 36 generates a constant signal to control means 38. However, when target plate 28 comes into position beneath detector 16, target 34 is aligned with position detector 14. Upon detecting the presence of target 34, position detector 14 will close a contact allowing a signal to pass to track and hold device 36, telling it to discontinue generating its own signal and to transmit the signal generated by liquid level detector 16. This signal is then transmitted by track and hold device 36 to control means 38 and the transmission continues until track and hold device 36 is again signaled by position detector 14 to transmit a new signal from detector means 16 which will happen upon the next complete revolution of filler bowl 12.

Control means 38 then compares the signal it has received from liquid level detector means 16 with a predetermined signal level. If the signal from detector means 16 is below the value indicative of an optimum liquid level, control means 38 will provide a signal to the servo valves or variable speed pumps resulting in a higher rate of flow of liquid into the filler bowl. If the signal from liquid level detector means 16 is greater than a value indicative of optimum liquid level, valve control device 38 will generate a signal to the servo valves or variable speed pumps which decreases the rate of flow of liquid into the filler bowl.

The present device thus provides for periodic monitoring of the liquid level in the filler bowl and a periodic adjustment of the rate of flow of liquid into the filler bowl without any physical connections between the liquid level indicator and the liquid level detector.

Various modes for carrying out the invention are contemplated as being within the scope of the following claims particularly pointing out and distinctly claiming the subject matter which is regarded as the invention.

I claim:

1. A rotatable filler bowl and apparatus for detecting and maintaining the level of a liquid in said rotatable filler bowl at a predetermined level, the filler bowl having an inlet for receiving liquid and a plurality of outlets for filling containers with liquid from the bowl, said apparatus comprising:

a float disposed within the liquid in the bowl and comprising a substantially hollow float body and a hollow rod, said float body having a substantially centrally located opening running therethrough, said float body being slideably mounted on said hollow rod and said hollow rod being attached to and vertically extending into the filler bowl so that variations of the liquid level in the bowl result in a vertical displacement of said float body along said hollow rod and said float body having at least one permanent magnet disposed within said body substantially adjacent said rod, liquid level indicator means comprising a magnetically responsive bar disposed within said rod and extending substantially along the entire length of said rod and extending outwardly of the bowl with a target plate mounted at the end of said bar extending outwardly of the bowl so that vertical displacement of said float results in vertical displacement of said magnetically responsive bar, said float and said liquid level indicator means being mounted for rotation with the bowl, stationary detector means for detecting the position of said liquid level indicator, position detecting means for determining that said rotating liquid level indicator means is aligned with said stationary detector means and that a measurement may be taken, means for comparing the position of said liquid level indicator means with a predetermined position, flow control means for controlling the rate of flow of fluid into the bowl, control means operably connected to said comparing means for regulating the operation of said flow control means so that upon detection of a liquid level indicator means position below said predetermined position said flow control means are actuated to increase the rate of flow into the bowl and upon detection of a satisfactory position or position above said predetermined position said flow control means are actuated to decrease the rate of flow into the bowl.

2. A rotatable filler bowl and apparatus for detecting and maintaining the level of a liquid in said rotatable filler bowl at a predetermined level, the filler bowl having an inlet for receiving liquid and a plurality of outlets for dispensing liquid from the filler bowl, said apparatus comprising:

a float disposed within the liquid in the filler bowl so that variations of the liquid level in the filler bowl result in a vertical displacement of said float, said float comprising a substantially hollow float body and a hollow rod, said float body having a substantially centrally located opening running therethrough, said float body being slideably mounted on said hollow rod and said rod being attached to and vertically extending into the filler bowl, said float body having at least one permanent magnet disposed within said body substantially adjacent said rod, liquid level indicator means for indicating the level of liquid in the filler bowl at a point external of the filler bowl, said liquid level indicator means being mounted for rotational movement with the bowl and operably connected to said float, the liquid level indicator means comprising a magnetically responsive bar disposed within said rod and extending substantially along the entire length of said rod and having an end portion extending outwardly of the bowl and projecting from the bowl and a target plate mounted at the end portion of said bar projecting from the bowl, stationary detector means for detecting the position of said liquid level indicator means, means for comparing the position of said liquid level indicator means with a predetermined position, flow control means for controlling the rate of flow of fluid into the filler bowl, control means operably connected to said comparing means for regulating the operation of said flow control means so that upon detection of a liquid level indicator means position below said predetermined position said flow control means are actuated to increase the rate of flow into the filler bowl and upon detection of a satisfactory position or position above said predetermined position said flow control means are actuated to decrease the rate of flow into the filler bowl.

3. The apparatus of claim 2 further comprising position detecting means for determining that said rotating liquid level indicator means is aligned with said stationary detector means and that a measurement may be taken.

* * * * *